United States Patent
Kobayashi (10) Patent No.: US 8,218,036 B2
(45) Date of Patent: Jul. 10, 2012

(54) IMAGE SENSING APPARATUS AND CONTROL METHOD THEREFOR

(75) Inventor: Taro Kobayashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 248 days.

(21) Appl. No.: 12/628,512

(22) Filed: Dec. 1, 2009

(65) Prior Publication Data

US 2010/0157113 A1 Jun. 24, 2010

(30) Foreign Application Priority Data

Dec. 18, 2008 (JP) ................................. 2008-322955

(51) Int. Cl.
- H04N 5/217 (2011.01)
- H04N 9/64 (2006.01)
- H04N 5/235 (2006.01)

(52) U.S. Cl. ...................... 348/241; 348/249; 348/229.1

(58) Field of Classification Search .................. 348/241, 348/243, 246, 255, 251, 230.1, 229.1, 224.1, 348/249, 250, 345, 221.1

See application file for complete search history.

(56) References Cited

U.S. PATENT DOCUMENTS

| | | | |
|---|---|---|---|
| 5,943,094 A * | 8/1999 | Sakai et al. ................... 348/243 |
| 6,900,837 B2 * | 5/2005 | Muramatsu et al. .......... 348/243 |
| 7,728,891 B2 * | 6/2010 | Hiyama et al. ................. 348/294 |
| 7,733,391 B2 * | 6/2010 | Nikkanen et al. ............. 348/246 |
| 2006/0192865 A1 * | 8/2006 | Suzuki .......................... 348/241 |
| 2007/0030373 A1 * | 2/2007 | Kobayashi et al. ........... 348/315 |
| 2007/0229687 A1 * | 10/2007 | Hiyama et al. ................. 348/294 |

FOREIGN PATENT DOCUMENTS

| | | |
|---|---|---|
| CN | 101047798 A | 10/2007 |
| JP | 11-289494 | 10/1999 |

OTHER PUBLICATIONS

The above reference was in a Jul. 26, 2011 Chinese Office Action, which is enclosed with English Translation, that issued in Chinese Patent Application No. 200910259466.2.

* cited by examiner

Primary Examiner — Tuan Ho
Assistant Examiner — Ahmed A Berhan
(74) Attorney, Agent, or Firm — Cowan, Liebowitz & Latman, P.C.

(57) ABSTRACT

An image sensing apparatus including an image sensor that performs photoelectric conversion and outputs an image signal, a subtraction circuit that subtracts a black image signal obtained from the image sensor when the image sensor is shielded from light from a subject image signal obtained from the image sensor when the image sensor is exposed, a setting unit that sets a shooting condition, and a control unit that controls a thinning rate during thinning readout from the image sensor of the black image signal in accordance with the shooting condition set by the setting unit.

6 Claims, 5 Drawing Sheets

| THINNING RATE | READOUT TIME [ms] | NUMBER OF PIXELS IN 1 BLOCK |
|---|---|---|
| 1/1 | APPROXIMATELY 150 [ms] | 1728 |
| 1/5 | APPROXIMATELY 30 [ms] | 288 |
| 1/10 | APPROXIMATELY 15 [ms] | 96 |

FIG. 5B

| ISO SENSITIVITY | S (SIGNAL VALUE) | N (NOISE VALUE) | S/N RATIO [dB] | MINIMUM ADDITION NUMBER n | THINNING RATE k |
|---|---|---|---|---|---|
| 100 | 200 | 1 | -46.0206 | 4 | 1/10 |
| 200 | 200 | 2 | -40 | 16 | 1/10 |
| 400 | 200 | 4 | -33.9794 | 64 | 1/10 |
| 800 | 200 | 8 | -27.9588 | 256 | 1/5 |
| 1600 | 200 | 16 | -21.9382 | 1024 | 1/1 |

IMAGE SENSING APPARATUS AND CONTROL METHOD THEREFOR

BACKGROUND OF THE INVENTION

1. Field of the Invention

The present invention relates to an image sensing apparatus and a control method therefor, and more particularly, to an image sensing apparatus that carries out dark shading correction and a control method therefor.

2. Description of the Related Art

Conventionally, a variety of different dark shading correction methods have been proposed for correcting dark current noise in image sensors such as CCD sensors, CMOS sensors, and the like used in digital camera and other image sensing apparatuses.

Figure 6:
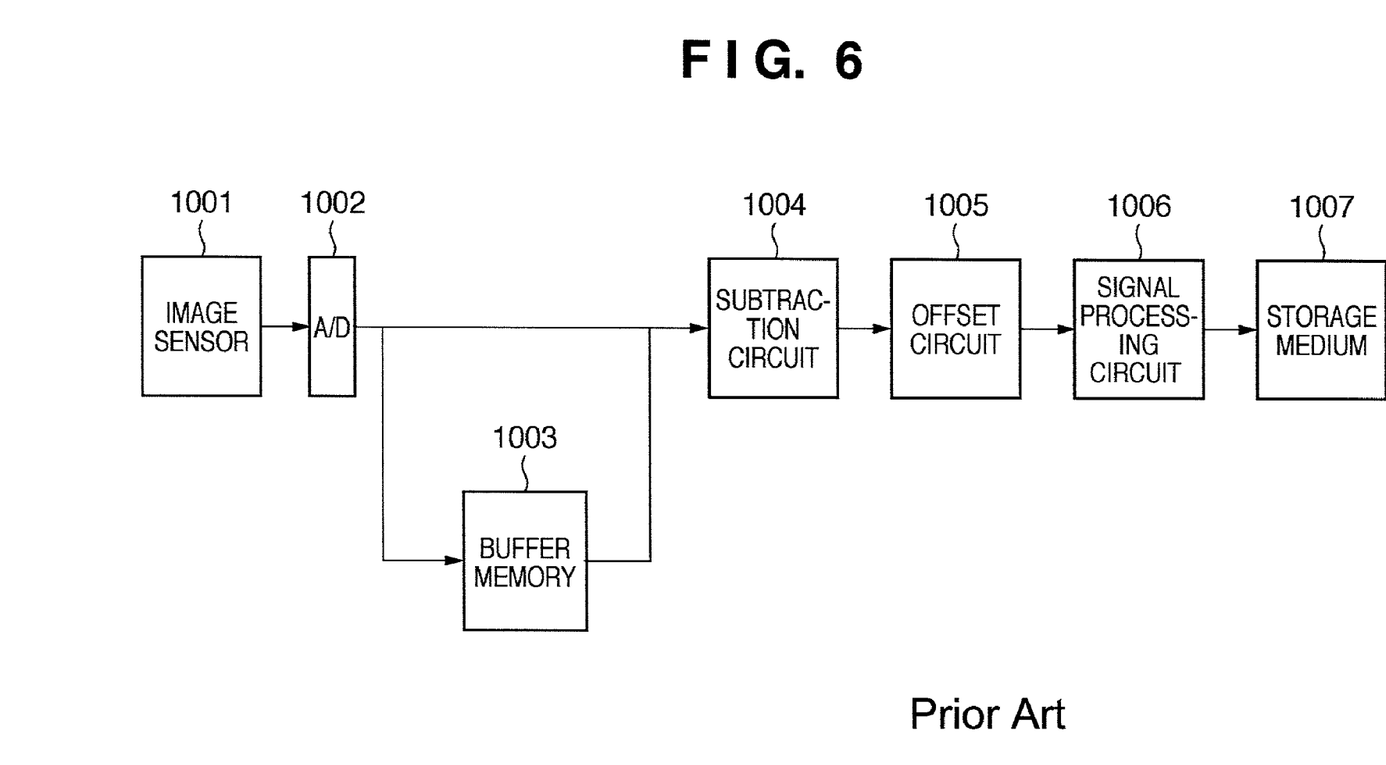
FIG. 6 is a schematic block diagram illustrating a functional configuration of a conventional image sensing apparatus.

FIG. 6 is a schematic block diagram showing an example of a functional configuration of a digital cameras for carrying out conventional dark shading correction. In the camera shown in FIG. 6, a subject is photographed by an image sensor 1001 under shooting conditions (aperture, shutter speed, sensitivity) set by exposure control operations, and accumulated electrical charge signals are read out from the image sensor 1001. The electrical charge signals are converted into digital signals by an A/D converter 1002 and recorded in a buffer memory 1003 as an image signal (hereinafter "subject image signal"). Then, under the same shooting conditions, shooting is carried out with the image sensor 1001 shielded from light, and the electrical charge signals thus acquired are converted into digital signals by the A/D converter 1002. An image signal acquired in this manner is hereinafter referred to as a black image signal.

At the same time as the black image signal is output from the A/D converter 1002, the subject image signal accumulated in the buffer memory 1003 is read out. Then, by subtracting the black image signal from the subject image signal at a subtraction circuit 1004, dark shading correction is carried out. An arbitrary offset value (for example, a 10-bit signal of approximately 32 LSB) is added to the dark shading-corrected subject image signal at an offset circuit 1005. The subject image signal to which an offset value has been added is then sent to a signal processing circuit 1006 and an image signal for one image is generated. The image signals generated in this manner are accumulated in a general purpose storage medium 1007 such as an SD card or the like.

However, with the dark shading correction method described above, because it uses two image signals (the subject image signal and the black image signal), random noise increases by a factor of $\sqrt{2}$ compared to a case in which dark shading correction is not carried out. In addition, because shooting operations and readout are carried out for two images, it takes time for shooting to finish.

In an invention described in Japanese Patent Laid-Open No. 11-289494, it is proposed that the black image signal be divided into a plurality of blocks, signals integrated at each block, and the integrated signals enlarged to suit the resolution of a subject image and then subtracted from the subject image. According to this method, because the random noise of the black image signal is reduced, degradation due to noise in the image signal after dark shading correction can be virtually eliminated.

However, with the method described in Japanese Patent Laid-Open No. 11-289494 also, in order to obtain an image signal of a single subject image, the image signal shooting operation and the readout operation are executed twice, as with the method described above with reference to FIG. 6. As a result, there is the problem that it takes time for shooting to finish, and during continuous shooting there is a considerable drop-off in shooting speed.

SUMMARY OF THE INVENTION

The present invention has been made in consideration of the above situation, and carries out dark shading correction more rapidly and prevents unnecessary S/N degradation caused by dark shading correction.

According to the present invention, provided is an image sensing apparatus comprising: an image sensor that performs photoelectric conversion and outputs an image signal; a subtraction unit that subtracts a black image signal obtained from the image sensor in a state in which the image sensor is shielded from light from a subject image signal obtained from the image sensor in a state in which the image sensor is exposed; a setting unit that sets a shooting condition; and a control unit that controls thinning readout from the image sensor when obtaining the black image signal in accordance with the shooting condition set by the setting unit.

Further, according to the present invention, provided is an image sensing apparatus comprising: an image sensor that performs photoelectric conversion and outputs an image signal; a subtraction unit that subtracts a black image signal obtained from the image sensor in a state in which the image sensor is shielded from light from a subject image signal obtained from the image sensor in a state in which the image sensor is exposed; and a control unit that calculates an average value of the image signal output from the image sensor in a state in which the image sensor is shielded from light at each block of multiple predetermined blocks, and controls whether or not to perform subtraction with the subtraction unit based on the calculated average value.

Furthermore, a control method for an image sensing apparatus having an image sensor that performs photoelectric conversion and outputs the image signal, the control method comprising: a subtraction step of subtracting a black image signal obtained from the image sensor in a state in which the image sensor is shielded from light from a subject image signal obtained from the image sensor in a state in which the image sensor is exposed; a setting step of setting a shooting condition; and a control step of controlling thinning readout from the image sensor when obtaining the black image signal in accordance with the shooting condition set by the setting unit.

Further, according to the present invention, provided is a control method for an image sensing apparatus having an image sensor that performs photoelectric conversion and outputs an image signal, the control method comprising: a subtraction step of subtracting a black image signal obtained from the image sensor in a state in which the image sensor is shielded from light from a subject image signal obtained from the image sensor in a state in which the image sensor is exposed; and a control step of computing an average value of the image signal output from the image sensor in a state in which the image sensor is shielded from light at each block of multiple predetermined blocks, and controlling whether or not to perform subtraction with the subtraction step based on the calculated average value.

Further features of the present invention will become apparent from the following description of exemplary embodiments with reference to the attached drawings.

DESCRIPTION OF THE EMBODIMENTS

Preferred embodiments of the present invention will be described in detail in accordance with the accompanying drawings.

Figure 1:
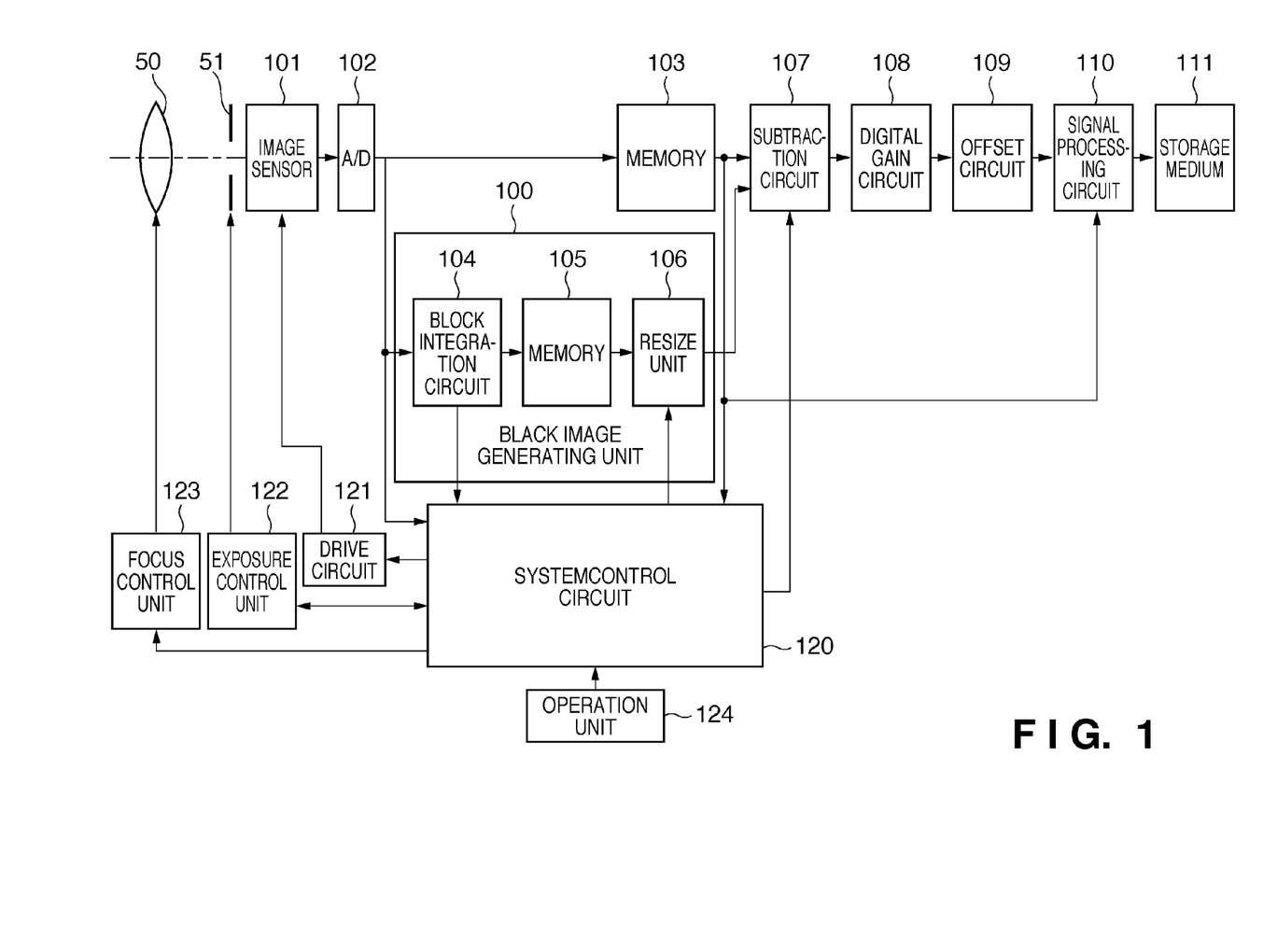
FIG. 1 is a block diagram showing a functional configuration of an image sensing apparatus according to an embodiment of the present invention.

FIG. 1 is a block diagram showing a schematic configuration of an image sensing apparatus that carries out dark shading correction according to embodiments of the present invention.

In FIG. 1, reference numeral 120 designates a system control circuit that controls the entire image sensing apparatus and reference numeral 50 designates a photographing lens. It is to be noted that although in FIG. 1 the photographing lens 50 is shown as a single lens, in actuality the photographing lens 50 is comprised of a plurality of lenses, such as a focus lens, a zoom lens, and so forth. Reference numeral 123 designates a focus control unit that controls the focus lens of the photographing lens 50 on the basis of control by the system control circuit 120. Reference numeral 51 designates a mechanical shutter having an aperture function, and reference numeral 122 designates an exposure control unit that controls the shutter 51 on the basis of control by the system control circuit 120.

Figure 3A:
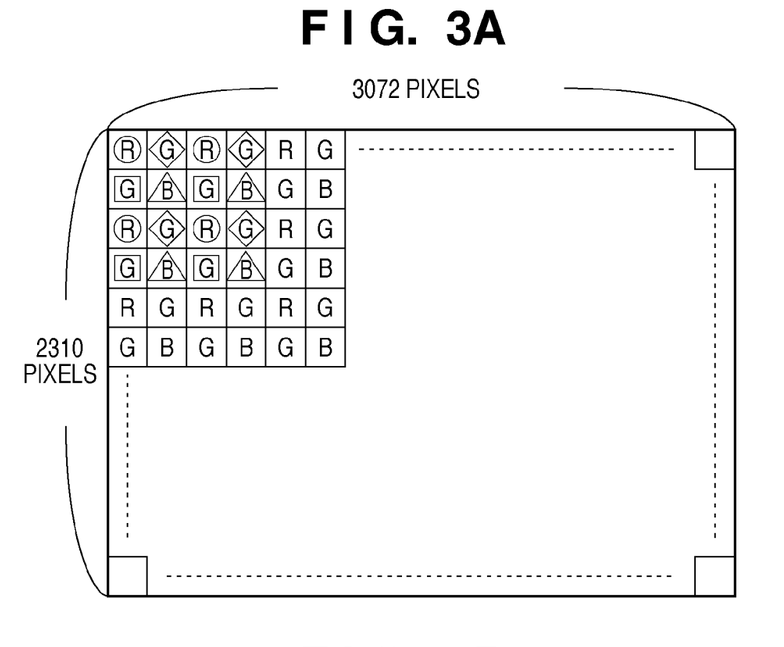
FIGS. 3A and 3B are diagrams showing an example of pixel addition in an image sensor according to an embodiment of the present invention.
Figure 3B:
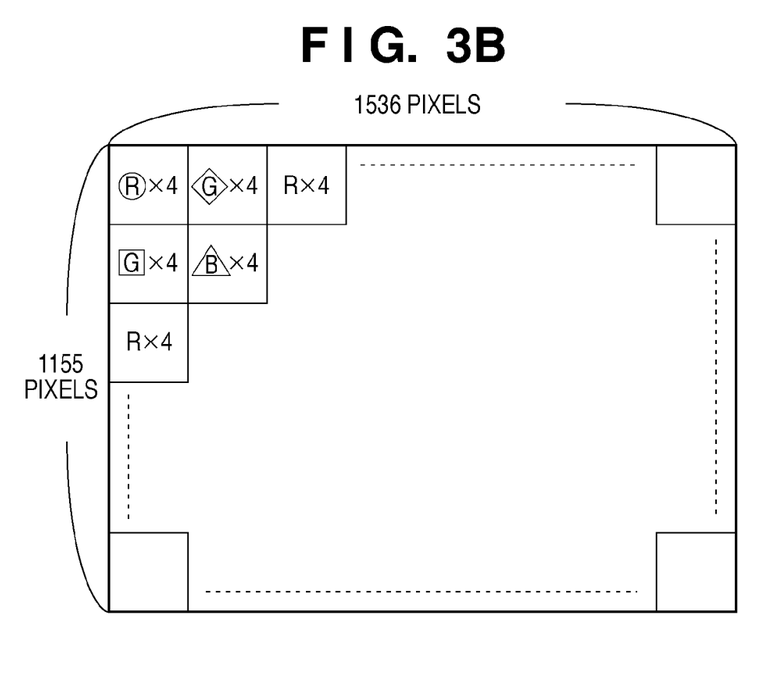

Reference numeral 101 designates an image sensor such as a CCD sensor or a CMOS sensor that generates and outputs electrical charges according to the amount of incoming light by photoelectric conversion. The image sensor 101 is configured so that, besides full pixel readout of all pixel signals, it is also capable of adding together particular pixels as well as thinning particular lines or columns and reading out the electrical charges. In the present embodiment, the image sensor 101 adds together 4 horizontally and vertically adjacent pixels of the same color out of those pixels that are covered by a Bayer arrangement filter like that shown in FIG. 3A. Then, as shown in FIG. 3B, the number of pixels can be reduced to 1/4. In addition, in the present embodiment pixel addition and thinning processing are applied between pixels of the same color. Accordingly, in the description that follows, for ease of explanation the 4 pixels of the 2×2 pixels (R, G, G, B) of the Bayer arrangement are given as 1 pixel. By so doing, in the present embodiment, FIG. 3B is represented as FIG. 4.

Figures 4, 5A:
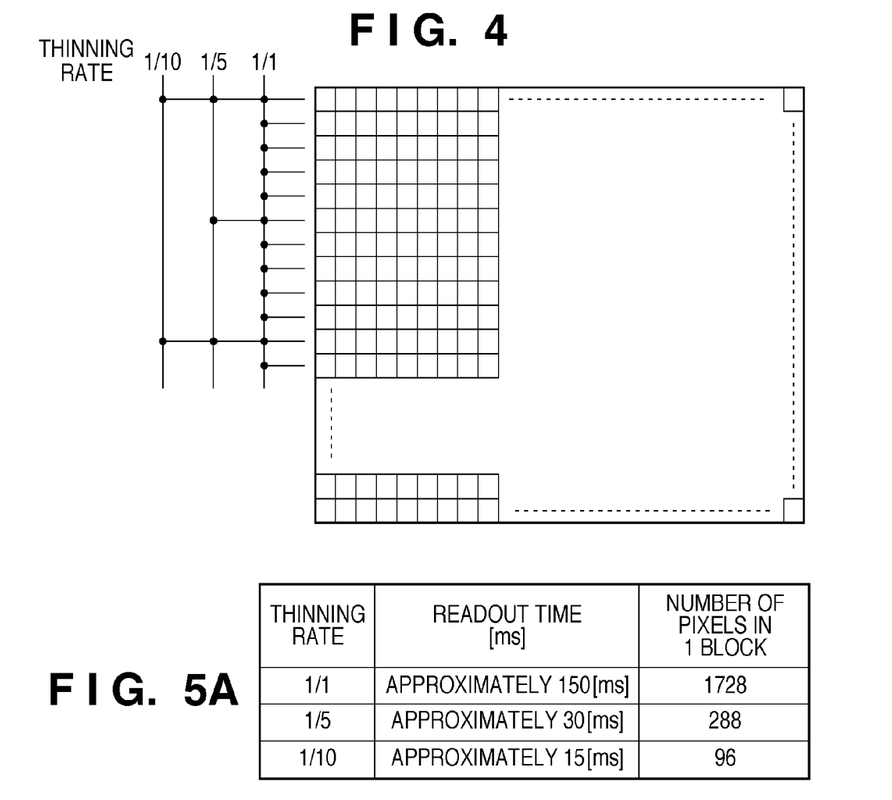
FIG. 4 is a diagram showing an example of thinning readout in an image sensor according to an embodiment of the present invention.
FIGS. 5A and 5B are diagrams illustrating a method of setting a thinning rate k according to an embodiment of the present invention.

Further, in the present embodiment, as shown in FIG. 4, the pixel-added image signal can be thinned out a particular number of lines and then read out. Hereinafter, when all the pixel signals are read out without thinning is referred to as a thinning rate of 1/1; when the pixel signals are thinned every 5 lines and then read out is referred to as a thinning rate of 1/5; and when the pixel signals are thinned every 10 lines and then read out is referred to as a thinning rate of 1/10.

It should be noted that although in the present embodiment a description is given of a case in which pixel addition is implemented by adding 2 pixels each in the vertical and horizontal directions for a total of 4 pixels, like the thinning rate the number of pixels to be added may also be changed as conditions warrant. In addition, although thinning is described as implemented in lines, it may also be implemented in columns, or in both lines and columns.

Reference numeral 121 designates a drive circuit that drives the image sensor 101 on the basis of control by the system control circuit 120.

Reference numeral 102 designates an A/D converter that converts the electrical charge signals output from the image sensor 101 into digital signals, and 103 designates a memory that stores the digital signals output from the A/D converter 102. Using the digital signals output from the A/D converter 102, the system control circuit 120 carries out TTL (through the lens)-type autofocus (AF) processing, automatic exposure (AE) processing, and flash pre-emission (EF) processing.

Reference numeral 100 designates a black image generating unit that generates a black image signal and which includes a block integration circuit 104, a memory 105, and a resize unit 106. The block integration circuit 104 integrates the digital signals output from the A/D converter 102 at every block, averages them by the number of pixels integrated, and acquires an average value at each block (hereinafter referred to as a block averaged signal). The memory 105 stores block averaged signals from the block integration circuit 104. The resize unit 106 resizes the block averaged signals stored in the memory 105 to a specified resolution.

Reference numeral 107 designates a subtraction circuit that subtracts the black image signal resized by the resize unit 106 from the digital signals stored in the memory 103. Reference numeral 108 designates a digital gain circuit, 109 designates an offset circuit, 110 designates a signal processing circuit, and 111 designates a storage medium.

In addition, reference numeral 124 designates an operation unit comprised of a shutter button, a mode switching dial, and so forth, for enabling a user to input instructions to the image sensing apparatus. Input content is reported to the system control circuit 120.

Figure 2:
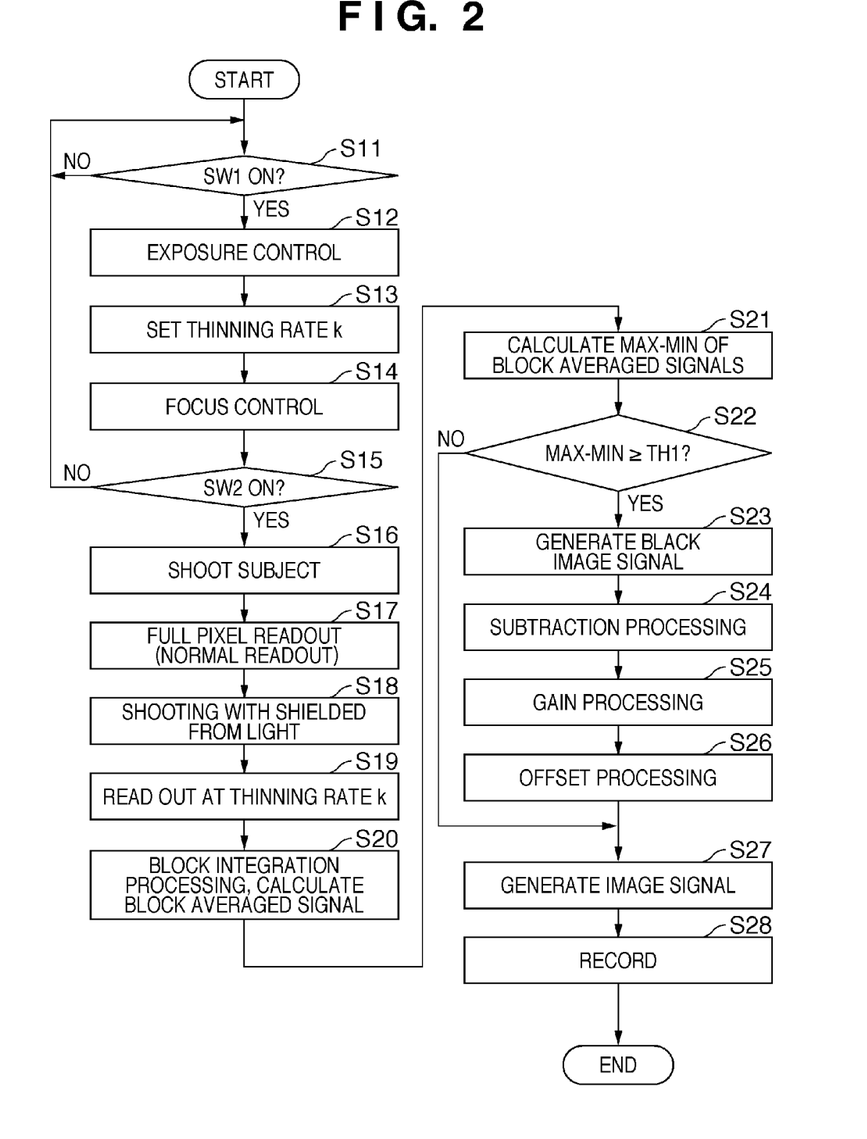
FIG. 2 is a flowchart showing operations during shooting according to an embodiment of the present invention.

FIG. 2 is a flowchart showing operations at shooting with the image sensing apparatus of the present embodiment. A description is now given of a dark shading correction method of the present embodiment while referring to FIG. 1 and FIG. 2.

First, in step S11, it is awaited for a switch SW1, which is switched ON, for example, by a partial operation (for example, a half stroke) of the shutter button included in the operation unit 124, to be switched ON. Once the switch SW1 is switched ON processing proceeds to step S12 and exposure control is carried out to set the shooting conditions (aperture, shutter speed, sensitivity) that the system control circuit 120 uses in shooting.

Next, in step S13, the system control circuit 120, in accordance with the sensitivity set in step S12, sets a thinning rate k to be used when reading out the electrical charges from the image sensor 101 during black shooting for dark shading correction. The thinning rate k is input to the drive circuit 121 during black shooting. A detailed description of the processing carried out in step S13 is given later.

Next, in step S14, focus adjustment control is carried out. In focus adjustment control, the system control circuit 120 controls the focus lens of the photographing lens 50 through the focus control unit 123, causing it to focus on the subject. Then, in step S15, it is determined whether or not a switch SW2, which is switched ON by, for example, a full stroke of the shutter button, has been switched ON. If the switch SW2 is OFF, processing returns to step S11 and the above-described processes are repeated. If the switch SW2 is on, processing proceeds to step S16.

In step S16, the exposure control unit 122 and the drive circuit 121 are controlled on the basis of the shooting conditions determined in step S12 and the image sensor 101 is exposed to shoot the subject. Then, once shooting is finished, in step S17 all the pixel electrical charge signals accumulated in the image sensor 101 are read out. The read-out electrical charge signals are converted into digital signals by the A/D converter 102 and stored in the memory 103 as an image signal (hereinafter "subject image signal").

Next, in step S18, under the same shooting conditions, black shooting is carried out with the image sensor 101 shielded from light by the shutter 51. In the succeeding step S19, the electrical charge signals accumulated in the image sensor 101 are read out, but this time using the thinning rate k determined in step S13.

As described above, in the present embodiment, at a thinning rate of 1/1 the electrical charge signals of all the lines are read out from the image sensor 101, at a thinning rate of 1/5 the electrical charge signals are read out after every 5 lines, and at a thinning rate of 1/10 the electrical charge signals are read out after every 10 lines. In addition, at the black image generating unit 100, the pixels of the effective region of the image sensor 101 are divided into two-dimensional blocks in the horizontal direction m and in the vertical direction n, and as described later generate a black image.

In step S19, the drive circuit 121 reads out the electrical charge signals from the image sensor 101 at the thinning rate k, and the read-out electrical charge signals are A/D converted by the A/D converter 102. In step S20, the block integration circuit 104 integrates the converted pixel digital signals at every m×n block. Further, the integrated value of each block is averaged by the number of pixels and the block averaged signal at each block is then stored in the memory 105.

Then, in step S21, the system control circuit 120 calculates the difference between the largest value MAX and the smallest value MIN of the block averaged signals (=MAX−MIN). In step S22, the MAX-MIN value is compared to a predetermined threshold value TH1. If the MAX-MIN value is equal to or greater than the threshold value TH1, then in step S23 the block averaged signals are converted (enlarged) to the resolution of the subject image signal by the resize unit 106. The signal obtained here is hereinafter referred to as a black image signal.

Subsequently, in step S24, the subtraction circuit 107 subtracts the black image signal obtained in step S23 from the subject image signal obtained in step S17, by which dark shading correction is carried out on the subject image signal. In step S25, the digital gain circuit 108 subjects the dark shading-corrected subject image signal to gain, and in step S26 the offset circuit 109 adds a preset offset value. Thereafter, in step S27, the corrected and processed subject image signal is transferred to the signal processing circuit 110, converted into a general purpose image signal (for example, a JPEG image signal), and, in step S28, recorded onto a storage medium 111 such as an SD card or the like.

On the other hand, if the results of the comparison conducted in step S22 indicate that the MAX-MIN value is smaller than the threshold value TH1, processing proceeds to step S27. In this case, subtraction by the subtraction circuit 107 is not carried out.

Determining whether or not to carry out subtraction depending on the MAX-MIN value as described above is done because the dark shading correction subtraction of the present embodiment entails some degradation of S/N ratio. Therefore, configuring matters so as to avoid subtraction in a case in which it is not necessary to carry out dark shading correction because the black image signal is substantially uniform over the entire screen is very effective in terms of suppressing S/N degradation. It is to be noted that although the present embodiment uses the example of MAX−MIN, the determination as to whether or not subtraction is required can be made using a variety of determination methods, such as those involving the use of a block average signal standard deviation or of image sensing apparatus temperature information.

Next, a description is given of a method of setting the thinning rate k carried out in step S13. The setting of the thinning rate k is done by the system control circuit 120.

By using thinning to reduce the number of pixels read out, the time needed to read out the electrical charges from the image sensor 101 can be shortened. At the same time, however, by reducing the number of pixels read out, the S/N ratio deteriorates because the number of pixels per block to be integrated decreases. Accordingly, in the present embodiment, the thinning rate k is changed depending on the sensitivity that is set. Since there is little sensor noise (random noise) when the sensitivity is low, the thinning rate k can be increased to achieve high-speed processing. Conversely, by decreasing the thinning rate k when the sensitivity is high, a black image signal can be produced without degrading the S/N ratio. In such a case, the processing time somewhat lengthens.

A specific example of the method used to calculate the thinning rate k is given below.

If the noise value is N, the number of pixels to be averaged is n, and the noise value when reading out 1 pixel at an ISO of 100 is $N_{100}$, then $$N > N_{100}/\sqrt{n} \quad (1)$$

Solving for n in equation (1) gives $$n > (N_{100}/N)^2 \quad (2)$$

For a noise value of $N_{100}$ when reading out 1 pixel, if the noise value N is reduced to 0.5 or less, it does not affect the image signal when taking the average of a plurality of pixels. If the noise value $N_{100}$ is used as a reference (100%, in other words=1), then at an ISO of 100, from equation (2) n=4, meaning that if 4 or more pixels are read out the noise value N drops to 0.5 or below and there is no effect from noise.

If the S/N ratio is expressed in decibels (dB), which is a comparison of voltages, then it can be expressed as 20*log (N/S). For example, at an ISO of 100, a digital image signal value S after A/D conversion of 200, and a noise value N of 1, the S/N ratio is $$S/N(ISO\ 100) = 20*\log(1/200) \approx -46\ dB$$

By contrast, when taking the average of 4 pixels, the S/N ratio is $$S/N(ISO\ 100) = 20*\log(0.5/200) \approx -52\ dB$$

At ISO 200, the noise value $N_{200}$ when reading out 1 pixel is twice the noise value $N_{100}$ (200%). Therefore, in order to reduce the noise level to the same N=0.5 as when the ISO is 100, from equation (2)

$$n > (2/0.5)^2$$

$$n > 16$$

Thus, it can be seen that the minimum pixel addition number n required to reduce the noise level to the same N=0.5 as at ISO 100 is 16 pixels.

Similarly, the minimum pixel addition number n is 64 pixels at ISO 400, 256 pixels at ISO 800, and 1024 pixels at ISO 1600.

FIG. 5A shows, by thinning rate, the readout time and the readout pixel number in the case of a block division number of 64 divisions in the horizontal direction and 64 divisions in the vertical direction of a 7-megapixel (3072×2310) image sensor. In this case, each block contains pixels of a number amounting to 48 columns in the horizontal direction and 36 lines in the vertical direction (the last block has 42 lines, but in order to simplify the calculation it is assumed to have 36 lines).

It is to be noted that, in the following calculations, each pixel in a pixel addition drive mode as shown in FIG. 3B obtained by pixel addition is converted to the number of pixels before addition (thus, in the case of the present embodiment the actual number of pixels is ×4).

In a case in which electrical charges read out at a thinning rate of 1/1 are integrated at each block, assuming a pixel addition number of 4, the number of pixels in 1 block is 24 pixels in the horizontal direction and 18 in the vertical direction, thus the total number of pixels of 1 block on the image sensor 101 is 24×18×4=1728. Incidentally, the number of pixels in 1 block when reading out 1 frame of an image without either pixel addition or thinning is the same 1728 pixels, although in this case the readout time is approximately 250 ms. By contrast, using pixel addition the readout time is only about 150 ms, thus showing the clear superiority of pixel addition readout.

Similarly, assuming a pixel addition number of 4, the number of pixels in 1 block with a thinning rate of 1/5 is 24 pixels in the horizontal direction and 3 pixels in the vertical direction (rounded off by eliminating fractions), then, the total number of pixels is 288 pixels. Similarly, with a thinning rate of 1/10 the number of pixels is 96.

Since the number of pixels is 96 at a thinning rate of 1/10, up to ISO 400 noise can be sufficiently minimized if readout is done at a thinning rate of 1/10 (k=1/10). Similarly, the effects of noise can be eliminated at a thinning rate of 1/5 (k=1/5) at ISO 800 and at a thinning rate of 1/1 (k=1/1) at ISO 1600.

Figure 5B:
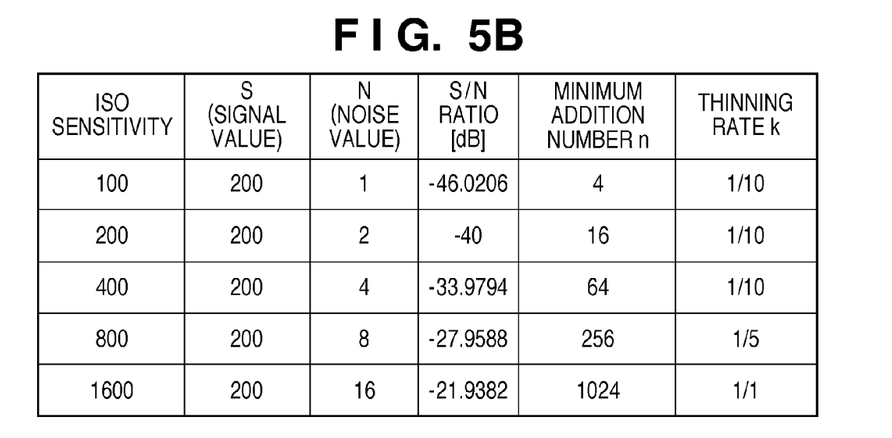

FIG. 5B is a chart showing, by sensitivity, the minimum addition pixel number n in order to avoid degrading the S/N ratio at each of ISO 100, 200, 400, 800, and 1600, and the thinning rate k required for reading out the minimum addition pixel number n. It is to be noted that, as can be appreciated from the foregoing description, the minimum addition pixel number n and the thinning rate k change in response to changes in such conditions as the image sensor 101 resolution and characteristics.

Controlling the readout pixel number as a thinning rate as described above enables the time for readout of the electrical charge signals shot with the image sensor shielded from light to be reduced, making it possible to achieve greatly speeded-up processing. For example, in a case in which the image sensor 101 is a 7-megapixel image sensor, although varying depending on the drive frequency, the readout time to read out from all the pixels is about 250 ms, whereas the time needed to read out at a thinning rate of 1/10 is about 15 ms.

Thus, as described above, the present embodiment measures noise values at each of multiple sensitivities in advance, determines the number of pixels to be read out from the image sensor that are required for dark shading correction, and controls the thinning rate k. With such a configuration, the present embodiment can achieve an increase in the speed of processing and a reduction in noise in the black image signal.

It is to be noted that although in the foregoing a description is given of operations to determine the number of pixels to be read out from the image sensor that are required for dark shading correction and the thinning rate k depending on the ISO sensitivity, alternatively the number of pixels to be read out from the image sensor that are required for dark shading correction and the thinning rate k may be fixed, without regard to the ISO sensitivity. In addition, the amount of thinning at readout of the pixel signals from the image sensor may be varied depending on the ISO sensitivity.

Moreover, by setting the thinning rate the same as for moving image readout during framing of still image shooting, the time needed to switch between still image shooting and still image framing can be shortened.

Further, although dark shading correction processing accompanied by black image shooting has often been carried out only under certain conditions in order to strike a good balance with shooting speed, by speeding up dark shading correction as in the present invention it becomes possible to perform dark shading correction all the time. In addition, in a case in which the black image signal is substantially uniform across the entire screen and there is no need for dark shading correction, by avoiding the subtraction process it also becomes possible to avoid unneeded subtraction after black image shooting as well.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-322955, filed Dec. 18, 2008, which is hereby incorporated by reference herein in its entirety.

What is claimed is:

1. An image sensing apparatus comprising:
    an image sensor that performs photoelectric conversion and outputs a charge signal;
    a subtraction unit that subtracts a black image signal obtained from a charge signal, read out from the image sensor in a state in which the image sensor is shielded from light, from a subject image signal obtained from a charge signal, read out from the image sensor in a state in which the image sensor is exposed;
    a setting unit that sets a shooting sensitivity; and
    a control unit that controls thinning readout from the image sensor when the charge signal is read out in the state in which the image sensor is shielded from light for obtaining the black image signal so as to read out the charge signal at a thinning rate in accordance with the shooting sensitivity set by the setting unit.

2. The image sensing apparatus according to claim 1, wherein the control unit controls the thinning rate so that random noise of the black image signal becomes lower than a predetermined noise value.

3. The image sensing apparatus according to claim 1, wherein
    the control unit calculates an average value of the charge signal read out from the image sensor in a state in which the image sensor is shielded from light at each block of multiple predetermined blocks, and controls whether or not to perform subtraction with the subtraction unit based on the calculated average value.

4. The image sensing apparatus according to claim 3, wherein the control unit causes subtraction to be performed using the subtraction unit in a case in which a difference between a maximum value and a minimum value of the average values calculated for the multiple blocks is equal to or greater than a predetermined threshold value, and causes subtraction not to be performed using the subtraction unit in a case in which the difference between the maximum value and the minimum value is smaller than the threshold value.

5. The image sensing apparatus according to claim 1, further comprising a black image generating unit that generates the black image signal by averaging the charge signal output from the image sensor in a state in which the image sensor is shielded from light at each block of multiple predetermined blocks, then converting the averaged charge signal to a predetermined resolution.

6. A control method for an image sensing apparatus having an image sensor that performs photoelectric conversion and outputs a charge signal, the control method comprising;

a subtraction step of subtracting a black image signal obtained from a charge signal, read out from the image sensor in a state in which the image sensor is shielded from light, from a subject image signal obtained from a charge signal, read out from the image sensor in a state in which the image sensor is exposed;

a setting step of setting a shooting sensitivity; and a control step of controlling thinning readout from the image sensor when the charge signal is read out in the state in which the image sensor is shielded from light for obtaining the black image signal so as to read out the charge signal at a thinning rate in accordance with the shooting sensitivity set in the setting step.

* * * * *